United States Patent [19]

Babel

[11] Patent Number: 4,979,855
[45] Date of Patent: Dec. 25, 1990

[54] MECHANISM FOR ANGULARLY POSITIONING A WORK SPINDLE

[75] Inventor: Werner Babel, Achweg, Fed. Rep. of Germany

[73] Assignee: MAHO Aktiengesellschaft, Pfronten, Fed. Rep. of Germany

[21] Appl. No.: 225,310

[22] Filed: Jul. 28, 1988

Related U.S. Application Data

[62] Division of Ser. No. 97,548, Sep. 14, 1987, Pat. No. 4,832,545.

[30] Foreign Application Priority Data

Sep. 22, 1986 [DE] Fed. Rep. of Germany ....... 3632106
Jul. 5, 1987 [EP] European Pat. Off. ........... 87108181

[51] Int. Cl.$^5$ .............................................. B23C 1/10
[52] U.S. Cl. .................................. 409/218; 409/231; 29/568; 74/813 L
[58] Field of Search ............... 408/4, 5; 409/218, 221, 409/230, 231, 232, 233, 234; 279/1 H; 29/568; 74/813 L

[56] References Cited

U.S. PATENT DOCUMENTS

| | | | |
|---|---|---|---|
| 2,873,822 | 2/1959 | Sloan | 279/5 |
| 2,953,974 | 9/1960 | Brodbeck | 409/221 |
| 3,422,724 | 1/1969 | Zankl et al. | 409/231 |
| 3,587,359 | 6/1971 | McCash | 29/568 |
| 4,103,589 | 8/1978 | Francis | 279/5 X |
| 4,356,609 | 11/1982 | Wollerman | 409/231 |
| 4,417,486 | 12/1983 | Tsukiji et al. | 74/813 P |
| 4,499,792 | 2/1985 | Tanabe | 74/813 L |
| 4,570,313 | 2/1986 | Holmstrom et al. | 409/231 |
| 4,581,811 | 4/1986 | Eckle | 29/568 |
| 4,690,252 | 9/1987 | Kottke et al. | 74/813 L |

FOREIGN PATENT DOCUMENTS

| | | |
|---|---|---|
| 1815724 | 6/1970 | Fed. Rep. of Germany . |
| 2306590 | 11/1976 | Fed. Rep. of Germany . |
| 2650758 | 5/1977 | Fed. Rep. of Germany . |
| 2002563 | 7/1977 | Fed. Rep. of Germany . |

*Primary Examiner*—Z. R. Bilinsky
*Assistant Examiner*—Robert Schultz
*Attorney, Agent, or Firm*—Baker, Maxham, Jester & Meador

[57] ABSTRACT

A mechanism for angularly positioning the work spindle of a program-controlled milling and drilling machine. The positioning mechanism comprises a drive unit mounted on the spindle housing for rotating the spindle after the main drive has been shut off, and a locating member for locating the work spindle when it has reached its predetermined angular position. Angular positioning of the work spindle will effect predetermined angular positions of the horizontal and vertical spindles. In accordance with one embodiment of the invention, the drive unit comprises an electric motor the shaft of which is adapted to be selectively coupled by means of a pinion to a gear mounted on the spindle. The locating member is a spring-loaded indexing bolt having a centering cone for engagement in a bore formed in the gear. The electric motor and the indexing bolt are mounted on a pivot plate which is pivoted by an actuating drive from an upper inoperative position to a lower operative position.

19 Claims, 5 Drawing Sheets

MECHANISM FOR ANGULARLY POSITIONING A WORK SPINDLE

This is a divisional of co-pending application Ser. No. 097,548 filed on Sept. 14, 1987 and patented on May 23, 1989 as U.S. Pat. No. 4,832,545.

FIELD OF THE INVENTION

The invention is directed to a mechanism for angularly positioning the work spindle of a program-controlled milling and drilling machine to a predetermined position, such as for changing of tools.

BACKGROUND OF THE INVENTION

Mechanisms for positioning the work spindles are required for program-controlled milling and drilling machines (machining centers) so as to permit an automatic change of tools by means of a correspondingly designed tool changing assembly. For permitting the grippers of the changing assembly to reliably grip the tool which is to be changed, the tool and the work spindle must be jointly moved to and fixed in a predetermined angular position.

Various designs of mechanisms for positioning the spindle are already known, but such mechanisms are of complex design and expensive to manufacture. In one such positioning mechanism known from German patent publication 3,632,106, a cardioid curve is formed on the quill which is fixedly connected to the spindle. In the spindle housing, a plunger is mounted for movement by an actuating drive, the plunger having a rolling body rolling along the cam surface formed by the cardioid curve. When the spindle drive is shut off, the plunger is advanced by its actuating drive prior to each tool changing operation, whereby a corresponding rotation of the work spindle, which is disengaged from its drive train, to a position determined by the cardioid curve, is brought about. In this position of the work spindle the tool changing operation takes place by means of an automatic tool changing assembly, the grippers of which engage the collar of the respective machine taper to withdraw the tool after release of the collet chuck of the spindle from the latter.

For fixing the adjusted spindle position an additional spring-loaded fixing bolt may be provided in the spindle housing, which engages in a bore of the quill after the spindle has been adjusted to the changing position. A drawback of this known positioning mechanism is the excessive manufacturing effort due to the fine-machined cardioid curve and the necessary actuating drive for the plunger. Moreover, due to the quill which carries the cardioid curve there is an increase of the rotating mass and of the outer diameter of the spindle. The required arrangement of the plunger and its actuating drive adjacent the spindle results in an undesirable broadening of the spindle housing.

SUMMARY OF THE INVENTION

It is an object of this invention to provide for the work spindle of a program-controlled milling and drilling or universal milling machine a positioning mechanism which is of simple design and easy to manufacture, and which requires little space due to favorable arrangement in the spindle housing and is comprised of only a relatively few simple component parts.

In accordance with the invention the above-mentioned object is satisfied in that the actuating drive comprises an electric motor the shaft of which can be coupled by way of a pinion to a gear mounted on the spindle, and in that the locking element is a spring-loaded fixing bolt which, when the pinion is engaged, automatically engages in a bore formed in the gear and, when the coupling between the pinion and the gear is released, is automatically disengaged.

For program-controlled universal milling and drilling machines (machining centers) having work spindles which are selectively or alternately horizontal or vertical, an alternative embodiment positioning mechanism is provided which does not act directly on the one or the other work spindle but which positions the main drive shaft common to both work spindles at predetermined angular positions which correspond to the changing positions of the respective active work spindle. As compared to conventional positioning mechanisms, of which one was provided for the horizontal work spindle while another one was provided for the vertical work spindle, this novel solution represents a considerable simplification because it merely requires a single auxiliary drive means (electric motor) which, when the main drive has been shut off, rotates the main shaft and thus also the respective active work spindle at a relatively low speed. During this operation a selected fixing bolt is advanced toward an indexing ring mounted on the main shaft until its tapered centering point abuts the ring surface. An indexing hole is formed within the ring in which the fixing bolt engages with its tapered end portion, whereby the main shaft and simultaneously the respective active work spindle are stopped.

An advantageous embodiment of the invention provides that for both above-specified solutions the electric motor and the fixing bolt are mounted on a common support which is pivotable about an axis by a motor drive between an inoperative position and an operative position, wherein in the operative position the pinion of the auxiliary drive is engaged with the gear. The fixing bolt is disposed for axial movement in a support of the plate in eccentric and parallel relationship with the spindle axis so that its tapered centering point during rotation of the spindle by the electric motor slides under spring pressure along the upper surface of the gear, which is non-rotatably fixed to the spindle, and automatically engages in the correspondingly positioned centering hole in the gear. The amount of shifting movement of the fixing bolt in its support between two limit positions is less than the amount of the pivotal or lifting movement of the plate carrying the electric motor, so that the fixing bolt is withdrawn from the centering bore when the plate is moved by spring action from its operative bottom position to its inoperative top position.

The positioning mechanism according to the invention is disposed in the spindle housing and comprises component parts of simple construction. Due to the employment of the simple and therefore inexpensive electric motor for rotating the spindle it is possible to design the main drive train for the work spindle including its control unit in a simpler way. To summarize, the use of the positioning mechanism according to the invention results in accurate locating of the work spindle for each tool changing operation by technically simple means.

BRIEF DESCRIPTION OF THE DRAWING

The objects, advantages and features of this invention will be more readily appreciated from the following detailed description when read in conjunction with the accompanying drawing, in which.

DESCRIPTION OF THE PREFERRED EMBODIMENTS

Figure 1:
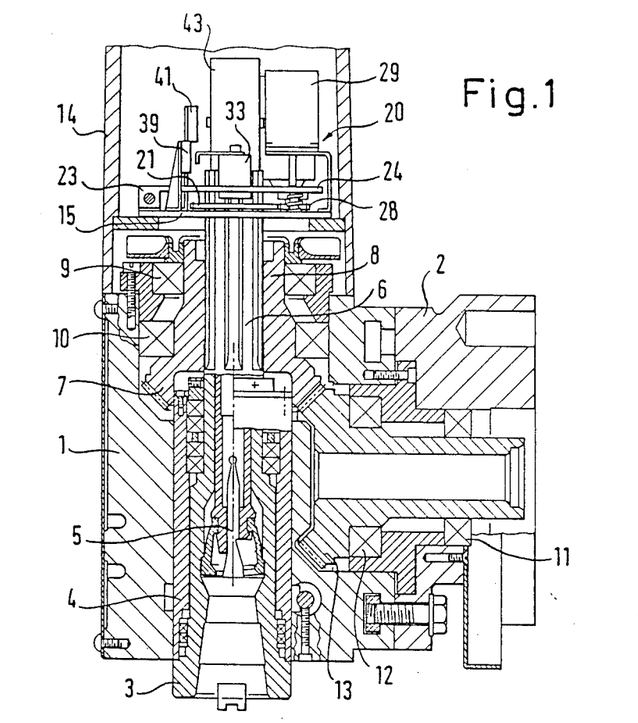
FIG. 1 is an axial sectional view of a vertical milling head of a milling machine comprising the positioning mechanism of the invention.

The vertical milling head illustrated in FIG. 1 comprises housing 1 which is mounted by means of adapter 2 to the end of a machine headstock (not illustrated). Work spindle 3 including quill 4 and inner collet chuck 5 are disposed in housing 1. Bevel gear 7 is keyed to splined upper portion 6 of spindle 3, sleeve-shaped part 8 of the bevel gear being supported in the housing by means of two roller bearings 9, 10. Bevel gear 7 meshes with second bevel gear 13 horizontally supported in adapter 2 by means of two roller bearings 11, 12, bevel gear 13 being joined to the horizontal shaft of the main drive for rotation therewith. The upper portion of the housing is formed by housing box 14 in which dimensionally stable plate 15 is fixedly mounted. This upper housing portion 14 accommodates positioning mechanism 20 which will be described below with reference to FIGS. 3 and 4.

Figure 2:
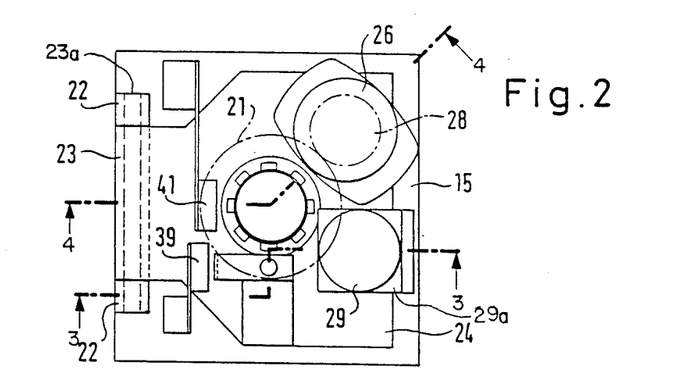
FIG. 2 is a plan view of the positioning mechanism of FIG. 1.

Cylindrical gear 21 formed with eccentric centering bore 19 (FIG. 3) is keyed to splined portion 6 of spindle 3 for rotation therewith above stationary plate 15 through which spindle 3 freely projects. On the left-hand side, as viewed in FIGS. 2, 3 and 4, bearing blocks 22 are mounted on plate 15 on which downwardly depending blocks 23 of pivot plate 24 are supported for pivotal movement about horizontal pivot axis 23A. Pivot plate 24 is approximately parallel to and vertically spaced from stationary plate 15. The pivot plate is above cylindrical gear 21 and is formed with central cut-out 25 through which splined spindle portion 6 projects. On the side of pivot plate 24, opposite the pivot 22, 23, electric motor 26 is mounted whose shaft 27, which is normal to the plane of the plate, rotatably projects through the pivot plate and carries cylindrical pinion 28. Actuating drive 29 is mounted on bracket 29A on stationary plate 15 adjacent electric motor 26. The actuating drive in the illustrated embodiment is typically a solenoid. The moveable part of the actuating drive, vertical plunger 30, is fixedly connected to the solenoid armature and bears against the surface of pivot plate 24. Instead of the illustrated solenoid the actuating drive may also be a pneumatic cylinder or the like. As will be apparent from FIG. 3, compression spring 31 is provided along the plunger axis between stationary plate 15 and pivot plate 24, the spring surrounding pin 32 secured in plate 15 and exerting an upwardly directed force on pivot plate 24.

Figure 3:
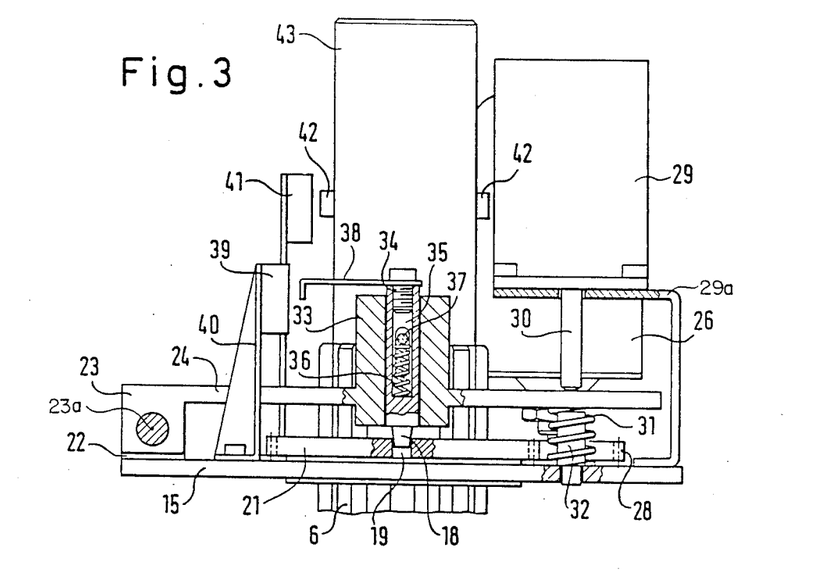
FIG. 3 is an enlarged partial sectional view taken along cutting plane 3—3 of FIG. 2 showing the positioning mechanism.
Figure 4:
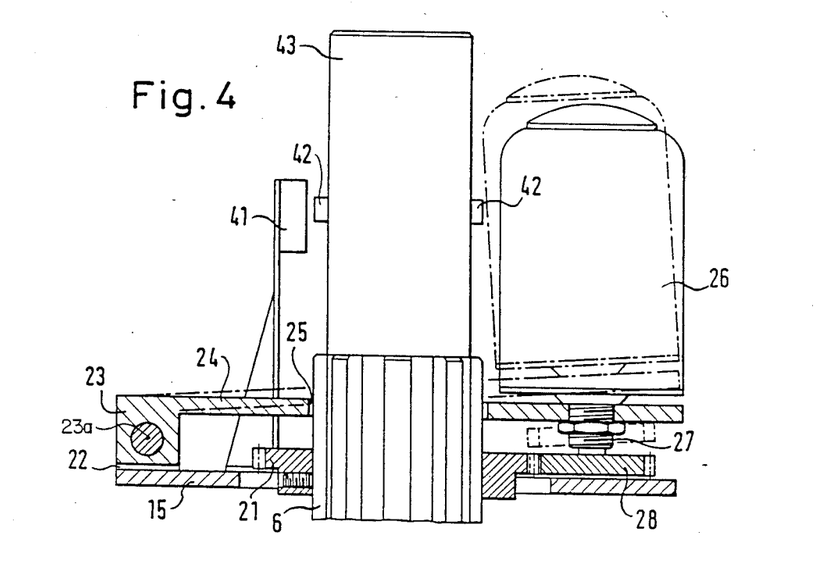
FIG. 4 is an axial sectional view taken along cutting plane 4—4 of the positioning mechanism of FIG. 2.

Holder 33 for fixing bolt 34 is provided on pivot plate 24. The fixing bolt is provided in a longitudinal bore of holder 33 for limited movement therein and comprises protruding fixing cone 18 as well as central blind hole 35 in which compression spring 36 is seated, the upper end of which bears against cross pin 37 secured in holder 33. Cross pin 37 is passed through slots formed in the sleeve-shaped upper portion of fixing bolt 34, the slots limiting the amount of longitudinal movement of the cross pin. The upper end of fixing bolt 34 has switching lug 38 secured thereto for contact-free cooperation with switch 39 mounted by means of profiled L-bar 40 on stationary plate 15 or on a suitable other part of the housing. Another switch 41, which is fixed to the housing, cooperates in contact-free fashion with trip cams 42 which are fixed at regular angular intervals in offset relationship on upper extension 43 of the spindle.

Operation of the positioning mechanism structure described above is as follows. When a tool, which is not illustrated, is to be changed, the main drive of the work spindle is shut off so that spindle 3, 6 may rotate freely. Thereupon actuating drive 29 is energized, the drive typically being either a solenoid, a pneumatic cylinder or a mechanical linear drive means. Plunger 30 of the actuating drive bears against the surface of pivot plate 24 acting against the bias of compression spring 31 from the upper inoperative position, which is illustrated in dashed lines in FIG. 4, to the lower operative position illustrated in full lines. Simultaneously with actuating drive 29 electric motor 26 is activated. The motor is positioned on the pivot plate in such a way that its pinion 28 automatically engages cylindrical gear 21 when the pivot plate is pivoted downwardly. Activated motor 26 therefore drives work spindle 3 through the pair of gears 28 and 21. When the pivot plate is lowered, the centering cone 18 of spring-loaded fixing bolt 34 bears against the surface of gear 21 on which it slides when the gear rotates. As soon as centering bore 19, which is correspondingly formed in cylindrical gear 21, moves beneath the centering cone, the latter is pushed into the bore by the action of the spring 36. This connection of cone and bore defines the machine tool changing position. On account of this engagement of the centering cone in the bore the rotation of the various parts by electric motor 26 is interrupted and thereby work spindle 3, 6 is stopped in the predetermined tool changing position. The shape of the centering cone ensures precise positioning of the gear and thus of the work spindle. The longitudinal displacement of fixing bolt 34 upon engagement thereof in bore 19 causes switch 39 to be activated, the switch indicating by a corresponding signal to the program control unit (not illustrated) that the work spindle has been positioned and is ready for an automatic change of tools.

When the change of tools has been completed, actuating drive 29 is deenergized, whereupon compression spring 31 moves pivot plate 24 to the upper inoperative position thereof. By way of this upward pivoting movement of plate 24 pinion 28 is disengaged from cylindrical gear 21, and centering cone 18 is withdrawn from bore 19.

Figure 5:
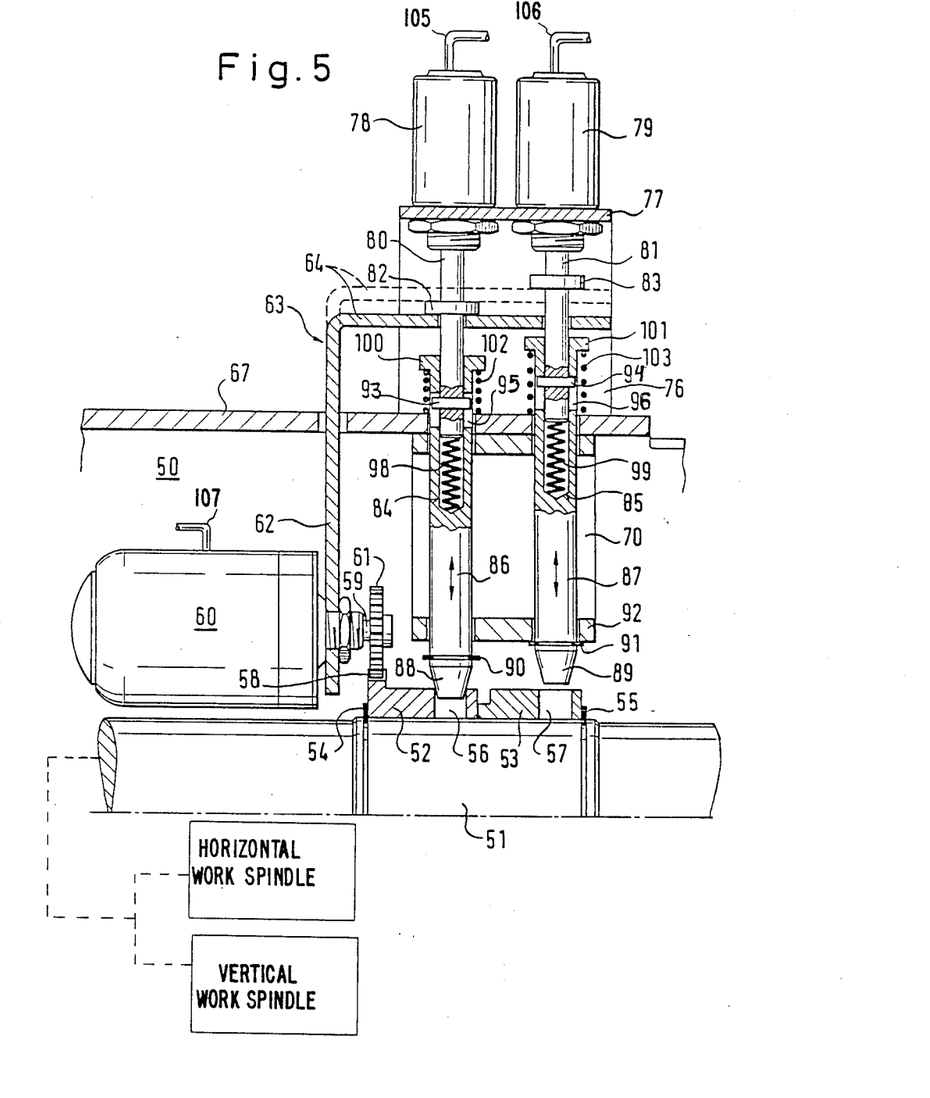
FIG. 5 is a side view of an alternative embodiment of the positioning mechanism of the invention for the main shaft.
Figure 6:
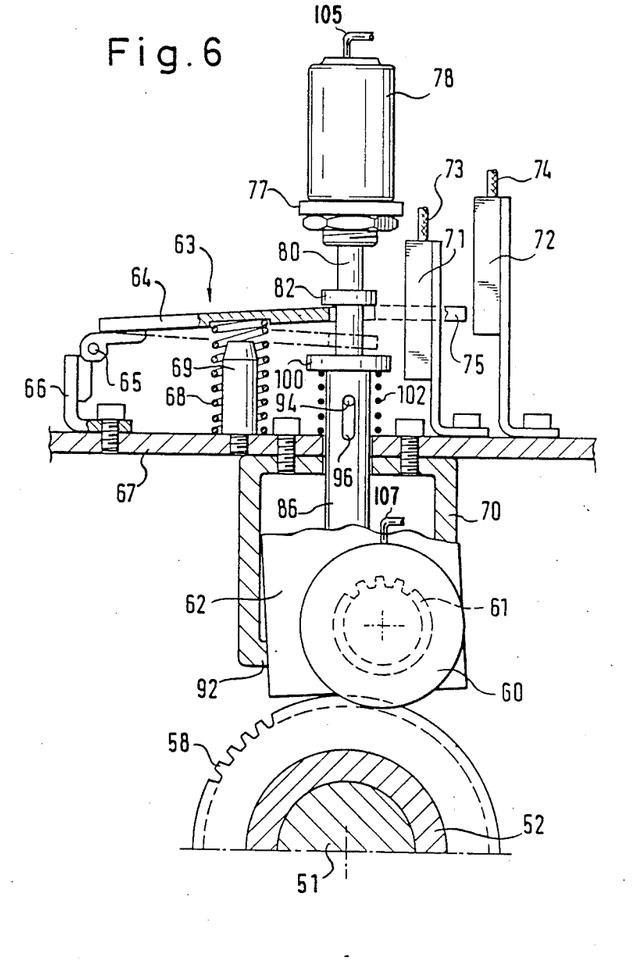
FIG. 6 is an end view of the mechanism of FIG. 5.
Figure 7:
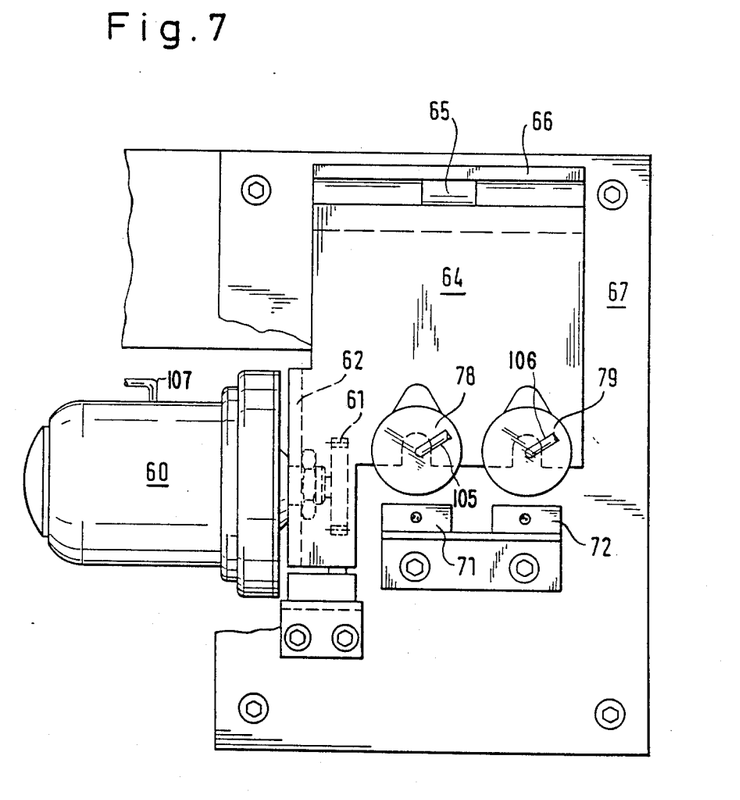
FIG. 7 is a top view of the mechanism of FIG. 5.

In the embodiment illustrated in FIGS. 5–7 the positioning mechanism is built into machine headstock 50 and acts directly on main drive shaft 51. The main drive shaft has two separate indexing rings 52 and 53 secured thereon by means of locating washers 54 and 55, each of said indexing rings including radial indexing bore 56 and 57 at a selected angular position. The two indexing rings are non-rotatably retained relative to each other and to the main drive shaft. The use of two separate rings permits the precise location of the angular position of indexing bores 56 and 57 during assembly with a view to the respective angular changing positions of the horizontal and vertical work spindles. It is also possible to use, instead of two separate rings 52 and 53, a common ring of corresponding length, which then includes two indexing bores 56 and 57 at suitable angular positions. Left-hand indexing ring 52, as viewed in FIG. 5, is provided with toothed wheel rim 58 which, in the illustrated operating state, is in engagement with a pinion 61 which is mounted on output shaft 59 of electric motor 60, comprising an auxiliary drive unit.

In the illustration of FIG. 6, pinion 61 of the electric motor is disengaged from toothed wheel rim 58. As will be apparent from FIGS. 5 and 6, electric motor 60 or, respectively, the end of its output shaft, is mounted on vertically bent plate-like arm 62 of pivotable bracket 63. As will be apparent from FIG. 6, bracket 63 comprises top plate 64 which is mounted with its left-hand end, by means of pivot bearing 65 and L-bar 66, on supporting wall or plate 67 of head-stock 50. Compression spring 68 bears against plate 67, the other end of that spring engaging the underside of plate 64 to urge it upwardly. Compression spring 68 is wrapped about pin 69 which functions as a guide element for the spring and at the same time as a limiting stop for movement of plate 64. Furthermore, bracket-like holder 70 is screwed to the underside of plate 67, on the top of which plate two contactless proximity switches 71 and 72 are mounted. These switches are connected by respective electrical leads 73 and 74 to the control system of the machine tool and are actuated in contactless fashion by blades 75 connected to indexing bolts 86 and 87.

As will be apparent from FIG. 5, supporting bracket 76 is mounted with its vertical arm on stationary plate 67, and two actuating or linear drive means 78 and 79, such as pneumatic cylinders or solenoids, are mounted in upright side-by-side relationship on horizontally bent upper arm 77 of the bracket. Plungers 80 and 81 of these two linear drive means 78 and 79 each include a collar 82 and 83 at a predetermined distance and engage with their respective lower end portions in blind holes 84 and 85 of respective indexing bolts 86 and 87. The indexing bolts are formed with tapered centering end portions 88 and 89 adapted to engage, as shown in FIG. 5, at least partially in the respective centering bores 56 and 57 of rings 52 and 53. Above each of these centering end portions 88, 89 a respective spring washer 90, 91 is provided as a limiting stop to the displacing movement. The spring washers in the elevated state (see the position of the right-hand locating bolt 87) are in engagement with a horizontally bent arm 92 of bracket-like holder 70. Each of plungers 80, 81 is connected by means of cross pins 93, 94 to the hollow portion of locating bolts 86, 87 for rotation therewith. Each axially extending slot 95, 96 respectively permits limited relative movement of the plunger in blind hole 84, 85 of respective locating bolt 86, 87. The free end of each blind hole 84, 85 has respective helical spring 98, 99 anchored therein for urging apart respective locating bolt 86, 87 and plunger 80, 81 accommodated therein. Moreover, between collar 100, 101 on the upper end of each locating bolt 86, 87 and stationary plate 67 a further spring 102, 103 is provided for biasing respective locating bolt 86, 87 toward the elevated position thereof.

Operation of the above positioning mechanism of FIGS. 5–7 will now be described. When either the horizontal or the vertical work spindle is to be stopped and locked in the predetermined changing position for a change of tools, the main drive (not illustrated) is shut off and one of the two linear drive means 78, 79 is activated through the illustrated leads 105, 106 by the control system. One of the linear drive means is allocated to the horizontal spindle and the other one is allocated to the vertical spindle. By extending respective plunger 80, 81 pivotable bracket 63, including upper support plate 64 and its vertical arm 62, is pivoted about bearing 65 from the upper position, which is shown in dashed lines in FIG. 5, to the full-line lower position. In this lower position pinion 61 of electric motor 60 is engaged with toothed wheel rim 58 on indexing ring 52 and activation of the electric motor through lead 103 to the control system imparts a slow rotational movement to main drive shaft 51. Extending respective plunger 80, 81 further results in an axial movement of indexing bolt 86, 87 coupled thereto, centering end portions 88, 89 of the respective bolt sliding along the surface of the respective ring 52,53 and upon passage of the respective indexing bore 56, 57 engaging therein as illustrated in respect of bolt 86, for example, on the left-hand side of FIG. 5. Each compression spring 98, 99 anchored in blind hole 84, 85 causes spring-loaded abutment of centering point 88, 89 of the respective indexing bolt 86, 87 on the smooth peripheral surface of the appropriate ring and a corresponding resilient engagement in respective indexing bore 56, 57. Due to this engagement main shaft 51 is fixed in a predetermined angular position which corresponds to the changing position of the horizontal or the vertical work spindle, which is coupled to the main drive shaft substantially without any clearance.

After completion of the tool changing operation the respective active linear drive means 78, 79 is shut off whereupon compression spring 102, 103 moves the indexing bolt from the engaged position shown to the left in FIG. 5 to the disengaged position shown to the right in FIG. 5. Compression spring 68 urges link 64 upwardly to thereby disengage the auxiliary drive means. Thus, the changing operation is completed, and the machine can operate with the freshly mounted tool.

The invention is not limited to the illustrated embodiment thereof. Thus, instead of using a solenoid it is possible to employ a different actuator such as a servo-cylinder, a spindle drive means or the like. Moreover, the power required for engaging the pinion with the gear may also be derived directly from the rotational movement of the motor shaft by suitable gearing and coupling means. Instead of using common pivot plate 24 it is possible to use other movable support members for the electric motor, the actuating drive and the fixing bolt. Further, power means other than an electric motor may be employed in the drive unit for rotating the spindle to the predetermined tool changing position. Additionally, there may be more than one predetermined angular position of the work spindle which may be effectuated by more than one cone 18 and bore 19 (FIG. 3).

What is claimed is:

1. In a universal milling machine having a control system, a spindle housing, a main drive, a main drive shaft having an axis, and the means for turning said main drive on and off, and vertical and horizontal work spindles being driven from the main drive shaft, an apparatus for selectively angularly positioning to predetermined angular positions said vertical and horizontal work spindles, said apparatus comprising:
- a movable support member coupled to the spindle housing, said support member having first and second positions;
- an auxiliary drive unit mounted on said support member for selectively engaging and rotating the main drive shaft after the main drive has been turned off, said auxiliary drive unit being adapted to be coupled to the main drive shaft for selectively positioning the vertical and horizontal work spindles, said auxiliary drive unit engaging said main drive shaft when said support member is in said second position and being disengaged from said main drive shaft when said support member is in said first position;
- indexing means for indexing the main shaft to predetermined angular positions corresponding to respective predetermined angular positions of the vertical and horizontal work spindles.

2. The apparatus recited in claim 1, wherein:
said auxiliary drive unit comprises first gear means mounted to the main drive shaft for rotation therewith and providing means for operatively coupling said auxiliary drive unit and said main drive shaft;
said indexing means comprising:
- a locating element for each vertical and horizontal work spindle;
- at least one indexing ring mounted to the main drive shaft for rotation therewith, said indexing ring being formed with a first surface with at least one indexing bore therein;
- power means for selectively driving said locating elements towards said indexing ring;
- said locating elements being locating bolts having one end adapted to engage said at least one indexing bore;
- said one end of one of said locating bolts being adapted to slide along said surface of said at least one indexing ring, the predetermined angular position being achieved when said one end of said locating bolt aligns with and engages said indexing bore.

3. The apparatus recited in claim 1, wherein:
said auxiliary drive unit comprises an electric motor;
said indexing means further includes said support member;
said motor being mounted on said support member.

4. The apparatus recited in claim 2, wherein:
said auxiliary drive unit comprises an electric motor;
said indexing means further includes said support member driven by said power means;
said motor being mounted on said support member.

5. The apparatus recited in claim 1, wherein:
said locating elements are oriented transversely with respect to the axis of the main drive shaft;
said indexing means further comprising:
linear drive units;
means for mounting said linear drive units to said machine;
said auxiliary drive unit comprising:
an electric motor having a shaft with second gear means mounted thereto, said motor being mounted to said support member;
first gear means mounted to the main drive shaft, said first and second gear means being adapted to be in selective engagement;
said linear drive units being adapted to move said support member and thereby move said motor so as to selectively move said first and second gear means into and out of engagement.

6. The apparatus recited in claim 2, wherein:
said locating elements are oriented transversely with respect to the axis of the main drive shaft;
said indexing means further comprising;
linear drive units coupled to said locating bolts for longitudinal movement thereof,
means for mounting said linear drive units to said machine,
said auxiliary drive unit comprising:
an electric motor having a shaft with second gear means mounted thereto, said motor being mounted to said support member;
said first and second gear means being adapted to be in selective engagement,
said linear drive units being adapted to move said support member and thereby move said motor so as to selectively move said first and second gear means into and out of engagement.

7. The apparatus recited in claim 1, said indexing means further comprising:
two indexing rings, each being formed with an indexing bore, said indexing rings being mounted to said main drive shaft; and
gear means coupled to one of said indexing rings for engaging said auxiliary drive unit.

8. The apparatus recited in claim 2, said indexing means further comprising:
two indexing rings, each being formed with an indexing bore, said indexing rings being mounted to said main drive shaft;
said first gear means being coupled to one of said indexing rings.

9. The apparatus recited in claim 1, wherein:
said indexing means comprises:
a spring-loaded link hinged to a pivot on said machine, said support member being pivotally mounted to said machine through said link;
said auxiliary drive unit comprising:
first gear means on said main drive shaft;
an electric motor having a shaft with second gear means mounted thereto, said motor being mounted to said support member;
said first and second gear means being adapted to be brought into mutual engagement by pivoting action of said link with said support member thereon.

10. The apparatus recited in claim 2, wherein:
said indexing means comprises:
a spring-loaded link hinged to a pivot on said machine, said support member being pivotally mounted to said machine through said link;
said auxiliary drive unit comprises:
an electric motor having a shaft with second gear means mounted thereto, said motor being mounted to said support member;
said first and second gear means being adapted to be brought into mutual engagement by pivoting action of said link with said support member thereon.

11. The apparatus recited in claim 1, wherein said locating means further comprises:
a linear drive unit associated with each vertical and horizontal work spindle;

an elongated axially movable plunger on said linear drive unit;
a locating bolt engageable by each said plunger; and
spring-loaded coupling means between each said plunger and associated locating bolt.

12. The apparatus recited in claim 2, wherein said indexing means further comprises:
a linear drive unit associated with each vertical and horizontal work spindle;
an elongated axially movable plunger on said linear drive unit;
one of said locating bolts being engageable by each said plunger; and
spring-loaded coupling means between each said plunger and associated locating bolt.

13. The apparatus recited in claim 3, wherein said indexing means further comprises:
a linear drive unit associated with each vertical and horizontal work spindle;
an elongated axially movable plunger on said linear drive unit;
a locating bolt engageable by each said plunger; and
spring-loaded coupling means between each said plunger and associated locating bolt.

14. The apparatus recited in claim 1, wherein:
said indexing means comprises actuating drive means associated with each vertical and horizontal work spindle;
said apparatus further comprising:
contactless proximity switch means adapted to sense the position of each said locating element; and
means adapted for operatively connecting said auxiliary drive unit and said actuating drive means to the control system.

15. The apparatus recited in claim 1, wherein: said indexing means further comprises:
actuating drive means comprising solenoid means having axially movable linear drive units for movement in one in one direction to the position to couple said auxiliary drive unit to the main drive shaft;
spring means biased against the coupling movement of said linear drive unit to the main drive shaft;
spring means biased against the coupling movement of said linear drive units; and
pivotable support means adapted to be acted upon by said linear drive units to move said auxiliary drive unit to the coupled position.

16. The apparatus recited in claim 11, wherein each said linear drive unit is a pneumatic cylinder.

17. The apparatus recited in claim 12, wherein each said linear drive unit is a pneumatic cylinder.

18. The apparatus recited in claim 13, wherein each said linear drive unit is a pneumatic cylinder.

19. The apparatus recited in claim 14, wherein said actuating drive means are pneumatic cylinders.

* * * * *